United States Patent [19]

Hall-Tipping

[11] Patent Number: 5,362,069
[45] Date of Patent: Nov. 8, 1994

[54] COMBINATION EXERCISE DEVICE/VIDEO GAME

[75] Inventor: Justin Hall-Tipping, Rowayton, Conn.

[73] Assignee: Heartbeat Corporation, Washington, D.C.

[21] Appl. No.: 985,254

[22] Filed: Dec. 3, 1992

[51] Int. Cl.$^5$ .............................................. A63B 69/16
[52] U.S. Cl. .................................. 273/438; 273/148 B; 273/440; 482/8; 482/9; 482/901; 482/902
[58] Field of Search .................... 273/DIG. 28, 148 B, 273/85 G, 438, 440; 482/8, 9, 901, 902

[56] References Cited

U.S. PATENT DOCUMENTS

| | | |
|---|---|---|
| 3,159,400 | 12/1964 | Brass et al. . |
| 3,419,732 | 12/1968 | Lane . |
| 3,454,942 | 7/1969 | Chamberlin et al. . |
| 3,518,985 | 7/1970 | Quinton . |
| 3,542,012 | 11/1970 | Frieberger et al. . |
| 3,675,640 | 7/1972 | Gatts . |
| 3,834,702 | 9/1974 | Bliss . |
| 3,845,756 | 11/1974 | Olsson . |
| 3,903,613 | 9/1975 | Bisberg . |
| 3,991,304 | 11/1976 | Hillsman . |
| 4,063,551 | 12/1977 | Sweeney . |
| 4,112,928 | 9/1978 | Putsch . |
| 4,141,630 | 2/1979 | Emmons . |
| 4,542,897 | 9/1985 | Melton et al. . |
| 4,709,917 | 12/1987 | Yang . |
| 4,711,447 | 12/1987 | Mansfield . |
| 4,720,789 | 1/1988 | Hector et al. . |
| 4,735,410 | 4/1988 | Nobuta . |
| 4,751,642 | 6/1988 | Silva et al. . |
| 4,790,528 | 12/1988 | Nakao et al. . |
| 5,001,632 | 3/1991 | Hall-Tipping . |

FOREIGN PATENT DOCUMENTS 0966865 4/1975 Canada .

Primary Examiner—Vincent Millin
Assistant Examiner—Kerry Owens
Attorney, Agent, or Firm—Steve Mendelsohn; William H. Murray

[57] ABSTRACT

A person simultaneously plays a video game and operates an exercise device, such as an exercise bicycle. A first sensor generates an output level signal indicative of the output level (e.g., pedal speed) of the exercise device. A second sensor generates an aerobic activity level (e.g., heart rate) signal indicative of the aerobic activity level of the exerciser. The output level signal affects the play of the video game. If the aerobic activity level signal is too low, the exercise device is made more difficult to operate and the play of the video game is altered to encourage the exercise to increase the output level of the exercise device. The play of the video game is also affected by signals generated by joystick controls operated by the exerciser's hands.

18 Claims, 2 Drawing Sheets

COMBINATION EXERCISE DEVICE/VIDEO GAME

INCORPORATION BY REFERENCE

U.S. Pat. No. 5,001,632 entitled "Video Game Difficulty Level Adjuster Dependent Upon Player's Aerobic Activity Level During Exercise," filed on Dec. 22, 1989, and commonly owned by the present assignee, is incorporated herein by reference.

BACKGROUND OF THE INVENTION

1. Field of the Invention

The present invention is directed to exercise devices and video games, and, in particular, to an apparatus that combines the operations of an exercise device and a video game.

2. Statement of Related Art

It is widely accepted today that moderate exercise, at an appropriate heart rate, for about 20 minutes three times a week, is sufficient to improve one's overall health. It is widely acknowledged that many exercisers have trouble maintaining even this limited exercise. The motivation and enjoyment that is usually required by individuals to maintain any activity, is almost absent from individual, non-competitive exercise. Video games, however, have for many years been regarded as very motivating and enjoyable. Various systems have attempted to integrate video games with exercise.

U.S. Pat. No. 4,720,789 to Hector et al. discloses a video game, or an exercise system utilizing a video display, that is played by movement of the game player's feet. The apparent objective is to require the game player to exercise while playing the game by moving his feet. However, the game player is required to move at the game's speed. The game in no way alters to conform to the individual's fitness level.

U.S. Pat. No. 4,711,447 to Mansfield integrates an exercise machine with a video game. To play the game, the operator is required to move a resistance-creating assembly, and in doing so, exercises. As with the previous patent, no attempt is made to adjust the video game to the player's fitness level.

U.S. Pat. No. 4,278,095 to Lapeyre discloses an exercise device connected to a video machine. The speed of the exercise device, and the accompanying video display, is controlled by the exerciser. As the exerciser signals an increase in speed to the exercise device, an accompanying signal is sent to the video machine, so that the exerciser is presented with a visual display of the increase in speed. The exerciser's heart rate is monitored and displayed on a T.V. monitor.

U.S. Pat. No. 4,512,567 to Phillips is directed to an exercise bicycle used to operate a video game. The game player receives exercise while operating the bicycle, and at the same time, moving the handlebars. The video game operates at a preset speed, thus making no allowance for the fitness of the player.

U.S. Pat. No. 4,630,817 to Buckley is directed to an exercise machine that allows for movement of a control rod, e.g., a handlebar, to provide two degrees of freedom to a controllable character in a video display. Resistance is provided to the handlebar to ensure that physical exertion is required by the user.

U.S. Pat. No. 4,709,917 to Yang discloses an exercise device that is furnished with an electronic display or a mechanical belt for simulating road conditions. A microprocessor controls the position of the exercise bicycle with respect to the scene being displayed and the running speed of the road condition simulation.

U.S. Pat. No. 5,001,632 to Hall-Tipping discloses a combination of a video game system and an exercise device whereby the play action of the video game is controlled by reference to the exerciser's heart rate and the output level of the exercise device.

The intent of all these systems is to integrate exercise with video display. However, none of them provides for the ability to regulate both the exercise device and the play of a video game according to the activity level of an exerciser.

SUMMARY OF THE INVENTION

The present invention is an apparatus useable with an exercise device and a video game that includes display means for displaying the video game. The apparatus comprises means for sensing the aerobic activity level of a user, and for outputting an aerobic activity level signal having a characteristic indicative of the user's aerobic activity level. The apparatus also comprises regulating means that, in turn, comprises means for adjusting the exercise device according to the aerobic activity level signal and means for adjusting the play of the video game according to the aerobic activity level signal.

The present invention is also an apparatus useable with an exercise device and a video game that includes display means for displaying the video game. The apparatus comprises means for sensing the output level of the exercise device, and for outputting an output level signal having a characteristic indicative of the output level. The apparatus also comprises means for sensing the aerobic activity level of a user, and for outputting an aerobic activity level signal having a characteristic indicative of the user's aerobic activity level. The apparatus further comprises regulating means that, in turn, comprises means for adjusting the exercise device according to the aerobic activity level signal and means for adjusting the play of the video game according to the output level signal.

The present invention is also an apparatus useable with an exercise bicycle and a video game that includes display means for displaying the video game, where the exercise device has a plurality of resistance levels and the video game has a plurality of levels of difficulty of play. The apparatus comprises means for sensing the pedal rate of the exercise bicycle, and for outputting an output level signal having a characteristic indicative of the pedal rate. The apparatus also comprises means for sensing the heart rate of a user, and for outputting a heart rate signal having a characteristic indicative of the user's heart rate. The apparatus also comprises a first user-operated control for generating a first control signal for controlling a first aspect of the play of the video game with one of the user's hands. The apparatus also comprises a second user-operated control for generating a second control signal for controlling a second aspect of the play of the video game with the other of the user's hands. The apparatus also comprises regulating means that, in turn, comprises means for adjusting the resistance of the exercise bicycle according to the heart rate signal, where the resistance of the exercise bicycle is increased in response to the heart rate signal falling below a first threshold level and the resistance of the exercise bicycle is decreased in response to the heart rate signal exceeding a second threshold level, where the second threshold level is greater than the first threshold level. The regulating means also comprises means for adjusting the level of difficulty of play of the video game according to the heart rate signal, where the level of difficulty of play of the video game is increased in response to the heart rate signal falling below the first threshold level and the level of difficulty of play of the video game is decreased in response to the heart rate signal falling below the second threshold level. The regulating means also comprises means for adjusting the play of the video game according to the output level signal. The regulating means also comprises means for adjusting the play of the video game according to the first and second control signals. The regulating means adjusts the play of the video game and the exercise bicycle according to a specified exercise profile having at least two exercise phases.

DETAILED DESCRIPTION OF THE INVENTION

Figure 1:
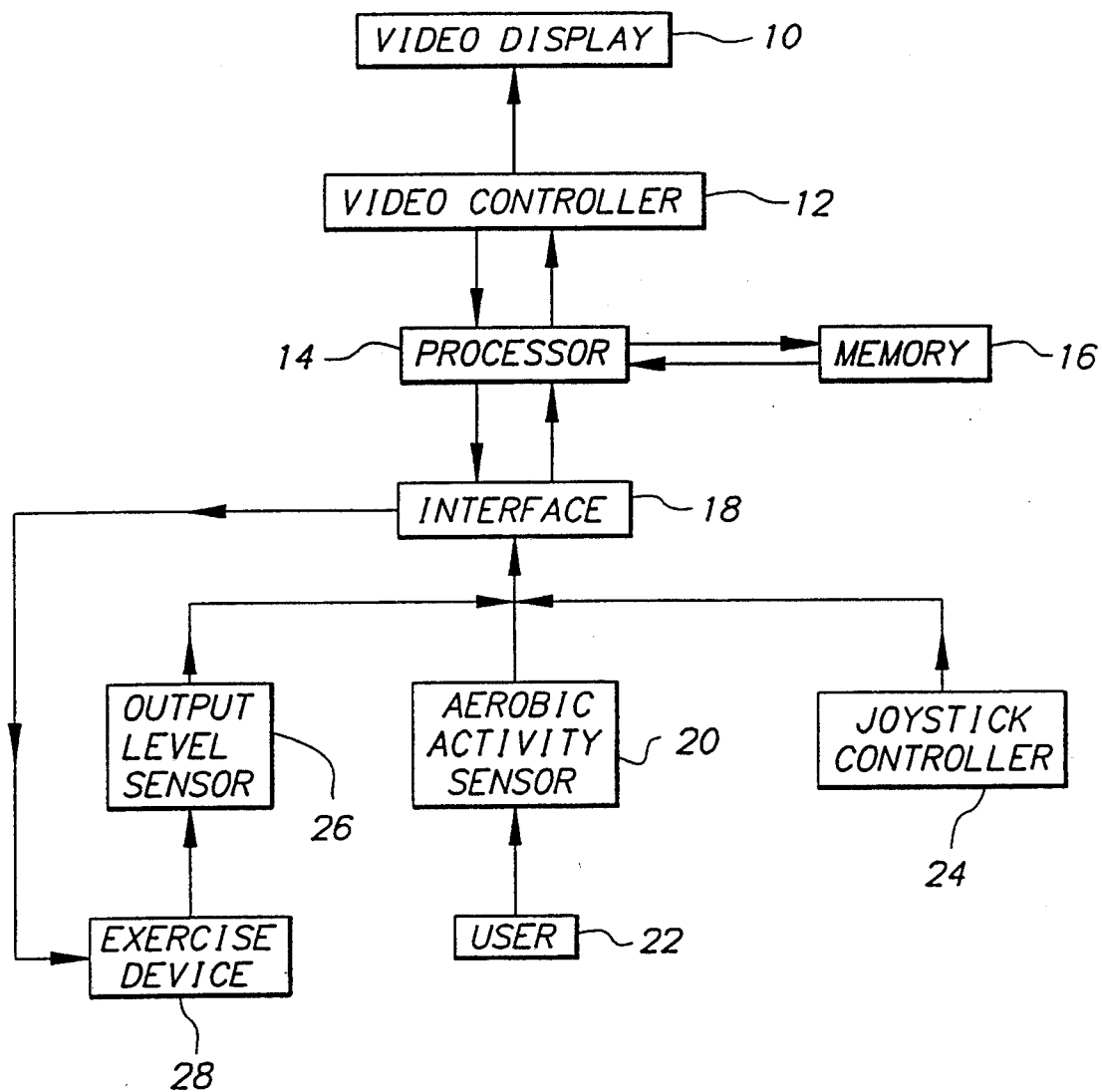
FIG. 1 is a block diagram of a combined exercise device/video game system according to a preferred embodiment of the present invention.

FIG. 1 is block diagram of combined exercise device/video game system 2 according to a preferred embodiment of the present invention. System 2, which is operated by user 22, comprises video display 10, video controller 12, processor 14, memory 16, interface 18, aerobic activity level sensor 20, joystick controller 24, output level sensor 26, and exercise device 28.

According to the present invention, aerobic activity level sensor 20 senses the aerobic activity level of user 22 and generates an aerobic activity level signal indicative of that aerobic activity level. Output level sensor 26 senses the output level of exercise device 28 and generates an output level signal indicative of that output level. The aerobic activity level signal and the output level signal are transmitted to processor 14 via interface 18. Processor 14 uses those signals to generate and transmit signals to video controller 12 that adjust the play of a video game. In addition, processor 14 uses the aerobic activity level signal to generate and transmit signals that adjust exercise device 28.

More particularly, processor 14 accesses memory 16 and receives signals from interface 18. Processor 14 generates and transmits signals to video controller 12 to display video game graphics on display device 10. Video controller 12 may be a commercial video game system such as the Sega Genesis system. Processor 14 also generates and transmits signals to exercise device 28 via interface 18 to control exercise device 28.

Output level sensor 26 generates a signal indicative of the output level of exercise device 28 and transmits that output level signal to processor 14 via interface 18. Exercise device 28 may be an exercise bicycle, a treadmill, a stair climbing device, a rowing machine, a cross-country skiing machine, or other type of exercise device. Output level sensor 26 may be an infrared sensor, optical sensor, magnetic sensor, or other type of sensor. In a preferred embodiment, exercise device 28 is an exercise bicycle and output level sensor 26 is built into the exercise bicycle. Output level sensor senses the speed at which the bicycle is pedaled.

Aerobic activity level sensor 20 generates a signal indicative of the aerobic activity level of user 22 of exercise device 28 and transmits that aerobic activity level signal to processor 14 via interface 18. The aerobic activity level may be the heart rate, blood oxygen content, or other measure of the aerobic activity level of user 22. Aerobic activity sensor 20 may be an earlobe clip heart rate sensor, chest-mounted heart rate sensor, or other device that senses the heart rate of user 22. Alternatively, aerobic activity sensor 20 may be a pulse oximeter for sensing the blood oxygen content of user 22.

Joystick controller 24 generates signals to control the play of a video game on video display 10 and transmits those signals to processor 14 via interface 18. In a preferred embodiment, two joystick controllers 24 are provided, one for each hand of user 22, each controller controlling at least one aspect of the video game. One controller may contain an X-directional pad for controlling movement of objects within the video game. The second controller may contain a series of buttons that cause changes within the video game.

Processor 14 combines the signals from output level sensor 26, aerobic activity level sensor 20, and joystick controller 24 to generate and transmit to video controller signals that control operations of the video game. Processor 14 also generates and transmits signals to exercise device 28 via interface 18 that control the operation of exercise device 28.

In a preferred embodiment of the present invention, exercise device 28 is an exercise bicycle 28, output level sensor 26 is built into bicycle 28, aerobic activity level sensor 20 is an earlobe clip heart rate sensor 20, joystick controller 24 comprises left-hand and right-hand controllers 24 mounted on the handlebars of bicycle 28, and video controller 12 is a Sega Genesis system. In this preferred embodiment, output level sensor 26 generates a signal representative of the rate at which bicycle 28 is being pedaled by user 22, heart rate sensor 20 generates a signal representative of the heart rate of user 22, and hand controllers 24 generate signals to control the play of a Sega Genesis video game. These three sets of signals are transmitted to processor 14 via interface 18.

According to this preferred embodiment, processor 14 uses these three sets of signals along with information stored in memory 16 to generate and transmit signals to the joystick input ports of Sega Genesis video controller 12 that are used to control the play of a video game. In addition, processor 14 uses the heart rate signal to generate and transmit signals to adjust the level of difficulty of pedaling (i.e., resistance of) bicycle 28.

The display of elements in the video game, for example the user's alter ego in the video game, are altered to provide a visual representation of the speed that user 22 is pedaling bicycle 28. The play of the video game, for example the relative motion of the user's alter ego and opposition pieces, and the resistance of bicycle 28 are controlled to ensure that the heart rate of user 22 conforms to specified thresholds.

Prior to commencing an exercise routine, user 22 uses hand controllers 24 to select the durations of the warm-up, work-out, and cool-down phases of his exercise routine and the threshold heart rate levels for each of these phases. The duration and intensity of these different exercise phases may be characteristic of those advised by the American Heart Association, however, user 22 may chose to enter an entirely different set of values.

Once user 22 commences the exercise routine, heart rate sensor 20 repeatedly compares the heart rate of user 22 against the threshold levels. If the user's heart rate does not conform with the threshold levels, processor 14 generates signals to alter both the play of the video game and the resistance of exercise devise 28 to encourage user 22 to achieve conformity with the threshold levels.

For example, if, during the work-out phase, the user's heart rate falls below the minimum heart rate for the work-out phase of the exercise routine, processor 14 will alter the video game to make user 22 speed up, perhaps by introducing a video game character to chase the user's alter ego in the video game. Simultaneously, processor 14 will increase the resistance of bicycle 28, thereby making it harder for user 22 to evade the chasing character in the video game, resulting in an increase in heart rate. After controller 14 recognizes a sufficient response by user 22, as determined from the user's heart rate, the play of the video game and the resistance of bicycle 28 will again be adjusted. The primary objective of the present invention is to keep people motivated to exercise on a regular basis, but also to ensure that they are only performing at the specified levels of aerobic activity.

Figure 2:
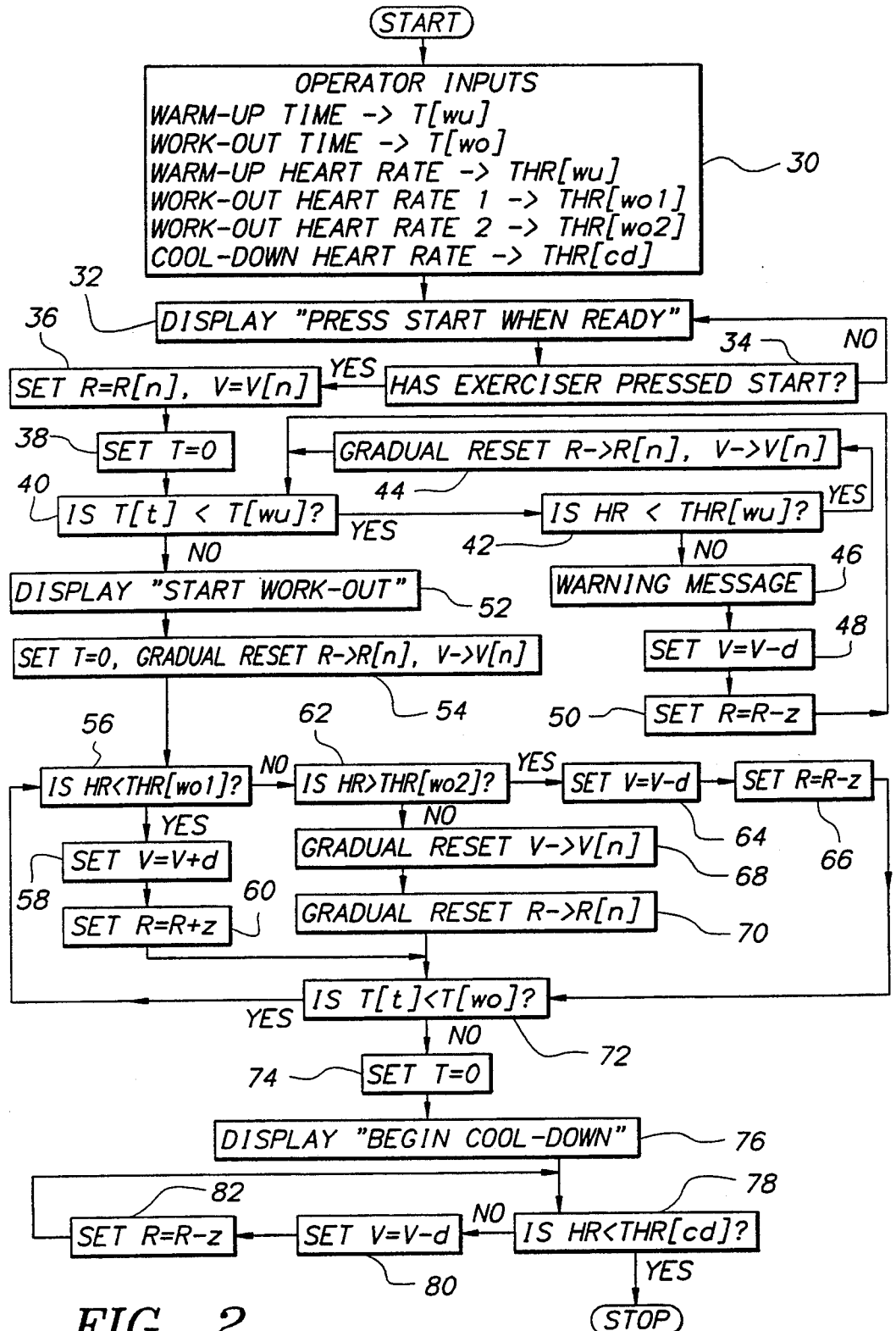
FIG. 2 is a flow chart of the logic used to control the system of FIG. 1.

FIG. 2 is a flow chart of the logic used to control combined exercise device/video game system 2 according to a preferred embodiment of the present invention. This logic is preferably stored in memory 16. Prior to starting an exercise routine, messages are displayed on video display 10 at block 30 to prompt user 22 to select the durations of the warm-up phase T[wu] and the work-out phase T[wo], the maximum heart rate for the warm-up phase THR[wu], the minimum heart rate for the work-out phase THR[wo1], the maximum heart rate for work-out phase THR[wo2], and the cool-down target heart rate THR[cd]. After these values have been entered, user 22 may save them in memory 16 for recall prior to a future exercise routine. User 22 makes these selections using hand controllers 24.

Once the required data is entered at block 30, video display 10 presents a message to prompt user 22 at block 32 to press a start button (not shown) to commence the exercise routine. Failure to press the start button will cause the message to be continually displayed (block 34). Once user 22 commences the exercise routine, both the resistance R of bicycle 28 and difficulty of play V of the video game are set to normal values R[n] and V[n], respectively, at block 36, and the timer T is set to zero at block 38. In a preferred embodiment of the present invention, user 22 is given the option in the set-up routine of block 30 to select the normal values of bicycle resistance R[n] and video game difficulty V[n].

During the warm-up phase, the user's heart rate is repeatedly monitored to ensure that it remains below the maximum warm-up heart rate. As long as it does, the bicycle resistance and video game difficulty remain at the normal values. If the user's heart rate exceeds the maximum warm-up heart rate, a warning is provided to the user, for example a message or a sound, to prompt the user to slow down the pedaling of the bicycle. In addition, the bicycle resistance and the video game difficulty are gradually lowered to make both the bicycle and the video game easier.

Since the response of the user's heart rate to decreases in work load is not instantaneous, the bicycle resistance and video game difficulty are decremented gradually over time. The decrement values are preferably sufficiently small so that changes are not perceived by the user as awkward in either the play of a game or the rhythm of the exercise routine.

In a preferred embodiment of the present invention, the speed of the bicycle may be used to predict direction of heart rate adjustment. For example, if the user's heart rate is still above the maximum warm-up heart rate, but the user has begun to pedal slower, that may be used as an indicator of an expected decline in heart rate. Accordingly, the bicycle resistance and video game difficulty may remain at their current levels.

Referring again to FIG. 2, block 40 compares the timer T[t] with the warm-up duration T[wu] to determine whether the warm-up phase is completed- If timer T[t] is less than T[wu], then the warm-up phase is not completed and block 42 compares the heart rate HR of user 22 with the maximum heart rate of the warm-up phase THR[wu]. If the user's heart rate HR is less than the maximum warm-up heart rate THR[wu], then the bicycle resistance R and the video game difficulty V are gradually set to normal values R[n] and V[n], respectively, at block 44.

However, if at block 42 the user's heart rate HR is not less than the maximum warm-up heart rate THR[wu], then a warning message is displayed on video display 10 at block 46 to prompt user 22 to slow down the pedaling of bicycle 28. In addition, block 48 reduces the video game difficulty V by decrement d and block 50 reduces the bicycle resistance R by decrement z. Processing then returns to block 40 to check again for the end of the warm-up phase.

The warm-up phase is completed at block 40 when the timer T[t] is not less than the warm-up phase duration T[wu]. In that case, block 52 displays a message on video display 10 informing user 22 of the start of the work-out phase and block 54 resets the timer T to zero and gradually resets the bicycle resistance R and video game difficulty V to normal levels R[n] and V[n], respectively.

During the work-out phase, if the user's heart rate is below the minimum work-out heart rate, the bicycle resistance and the video game difficulty are gradually increased. Again, small rates of change in both these variables are made to ensure continuity of game play and exercise. If the user's heart rate is above the maximum work-out heart rate, the bicycle resistance and the video game difficulty are decreased, again by small adjustments. Provided the user's heart rate is within the minimum and maximum work-out heart rates, the bicycle resistance and the video game difficulty remain at normal values.

Referring again to FIG. 2, block 56 compares the user's heart rate HR to the minimum heart rate of the work-out phase THR[wo1]. If the user's heart rate HR is less than the minimum work-out heart rate THR[wo1], then block 58 increases the video game difficulty V by increment d and block 60 increases the bicycle resistance R by increment z. Processing continues with block 72 to determine if the work-out phase is completed. If the timer T[t] is less than the work-out duration T[wo], then the work-out phase is not completed and processing returns to block 56.

If, at block 56, the user's heart rate HR is not less than the minimum work-out heart rate THR[wo1], processing continues to block 62, where the user's heart rate HR is compared to the maximum work-out heart rate THR[wo2]. If the user's heart rate HR is greater than the maximum work-out heart rate THR[wo2], then block 64 decreases the video game difficulty V by decrement d and block 66 decreases the bicycle resistance R by decrement z. Processing then proceeds to block 72.

If, at block 62, the user's heart rate HR is not greater than the maximum work-out heart rate THR[wo2], then block 68 gradually resets the video game difficulty V and the bicycle resistance R to the normal values V[n] and R[n], respectively. Again processing continues to block 72.

If, at block 72, the timer T[t] is not less than the work-out duration T[wo], then the work-out phase is completed and processing continues to block 74 where the timer T is reset to zero and then to block 76 where a message is displayed on video display 10 informing user 22 of the start of the cool-down phase.

During the cool-down phase, as long as the user's heart rate remains above the cool-down target heart rate, the video game difficulty and the bicycle resistance will be gradually reduced. When the user's heart rate falls below the cool-down target heart rate, the exercise routine is completed.

Referring again to FIG. 2, at block 76, the user's heart rate HR is compared to the cool-down target heart rate THR[cd]. If the user's heart rate HR is not less than the cool-down target heart rate THR[cd], then block 80 decreases the video game difficulty V by decrement d and block 82 decreases the bicycle resistance R by decrement z. Processing then returns to block 78. If, at block 78, the user's heart rate HR is less than the cool-down target heart rate THR[cd], then the exercise routine is completed.

Upon conclusion of the exercise routine, video display 10 presents a comparative performance display depicting the user's performance in the just-concluded exercise routine to those of previous routines by that same user. Some of the characteristics that may be displayed to represent comparative performance are the percentage of time that the user's heart rate conformed with the specified heart rate levels, the response time of the heart rate to changes in bicycle speed, and the recovery time upon conclusion of exercise.

In order to provide smooth transitions throughout the exercise routine, the resetting of bicycle resistance R and video game difficulty V is preferably performed gradually at blocks 44, 54, 68, and 70. This gradual resetting is preferably performed by adjusting bicycle resistance R and video game difficulty V by increments z and d, respectively, over multiple iterations.

Those skilled in the art will understand that, in alternative preferred embodiments of the present invention, the heart rate thresholds for controlling the play of the video game may differ from the heart rate thresholds used to control the exercise device.

It will also be understood that the exercise device may be adjusted in ways other than the changing of the exercise device resistance. For example, if the exercise device is a treadmill, the adjustment may be made in the speed of the treadmill or in the slope of the treadmill.

It will be further understood that the play of the video game may be adjusted in ways other than the changing of the video game difficulty. For example, in an appropriate video game, the play of the video game may be adjusted by changing the number of lives available to the user's alter ego in the video game.

Those skilled in the art will also understand that the adjustments to the exercise device and the play of the video game need not be based on fixed heart rate thresholds. For example, the exercise device resistance and video game difficulty may be continuous functions of the user's heart rate.

Although a preferred embodiment of the present invention has been shown and described, numerous variations and modifications will be apparent to those skilled in the art. The present invention is not limited to the specific embodiment disclosed and the scope of the invention is limited only by the appended claims.

What is claimed is:

1. An apparatus useable with an exercise device and a video game including display means for displaying the video game, comprising:
    a) means for sensing the aerobic activity level of a user, and for outputting an aerobic activity level signal having a characteristic indicative of said aerobic activity level;
    b) means for sensing the output level of the exercise device, and for outputting an output level signal having a characteristic indicative of said output level; and
    c) regulating means for:
        1) adjusting the exercise device according to said aerobic activity level signal;
        2) adjusting the play of the video game according to said aerobic activity level signal
        3) adjusting the play of the video game according to said output level signal, wherein:
    the exercise device comprises a plurality of difficulty levels;
    the video game comprises a plurality of levels of difficulty of play and at least one user-operated control for controlling the play of the video game; and
    said regulating means:
        1) adjusts the level of difficulty of the exercise device according to said aerobic activity level signal, wherein said level of difficulty of the exercise device is increased in response to said aerobic activity level signal falling below a first threshold level;
        2) adjusts the level of difficulty of play of the video game according to said aerobic activity level signal, wherein said level of difficulty of play of the video game is increased in response to said aerobic activity level signal falling below a second threshold level;
        3) adjusts the play of the video game according to said output level signal; and
        4) adjusts the play of the video game and the exercise device according to a specified exercise profile having at least two exercise phases.

2. The apparatus of claim 1, wherein said apparatus includes a first user-operated control for controlling a first aspect of the play of the video game with one of said user's hands and a second user-operated control for controlling a second aspect of the play of the video game with the other of said user's hands.

3. The apparatus of claim 1, wherein said regulating means decreases the level of difficulty of the exercise device in response to said aerobic activity level signal exceeding a third threshold level, said third threshold level being greater than said first threshold level.

4. The apparatus of claim 1, wherein said regulating means adjusts the play of the video game according to a specified exercise profile having at least two exercise phases.

5. The apparatus of claim 1, wherein said regulating means adjusts the exercise device according to a specified exercise profile having at least two exercise phases.

6. An apparatus useable with an exercise device and a video game including display means for displaying the video game, comprising:
   a) means for sensing the output level of the exercise device, and for outputting an output level signal having a characteristic indicative of said output level;
   b) means for sensing the aerobic activity level of a user, and for outputting an aerobic activity level signal having a characteristic indicative of said aerobic activity level; and
   c) regulating means for:
      1) adjusting the exercise device according to said aerobic activity level signal; and
      2) adjusting the play of the video game according to said output level signal, wherein:
   the exercise device comprises a plurality of difficulty levels;
   the video game comprises a plurality of levels of difficulty of play;
   said regulating means increases the level of difficulty of the exercise device in response to said aerobic activity level signal falling below a first threshold level; and
   said regulating means decreases the level of difficulty of play of the video game as said output level signal increases and increases the level of difficulty of play of the video game as said output level signal decreases.

7. The apparatus of claim 6, wherein said regulating means adjusts the play of the video game according to said aerobic activity level signal.

8. The apparatus of claim 6, further comprising at least one user-operated control for controlling the play of the video game.

9. The apparatus of claim 8, wherein said apparatus includes a first user-operated control for controlling a first aspect of the play of the video game with one of said user's hands and a second user-operated control for controlling a second aspect of the play of the video game with the other of said user's hands.

10. The apparatus of claim 6, wherein said regulating means decreases the level of difficulty of the exercise device in response to said aerobic activity level signal exceeding a second threshold level, said second threshold level being greater than said first threshold level.

11. The apparatus of claim 6, wherein said regulating means adjusts the play of the video game according to a specified exercise profile having at least two exercise phases.

12. The apparatus of claim 6, wherein said regulating means adjusts the exercise device according to a specified exercise profile having at least two exercise phases.

13. An apparatus useable with an exercise bicycle and a video game including display means for displaying the video game, the exercise device having a plurality of resistance levels and the video game having a plurality of levels of difficulty of play, comprising:
   a) means for sensing the pedal rate of the exercise bicycle, and for outputting an output level signal having a characteristic indicative of said pedal rate;
   b) means for sensing the heart rate of a user, and for outputting a heart rate signal having a characteristic indicative of said heart rate;
   c) a first user-operated control for generating a first control signal for controlling a first aspect of the play of the video game with one of said user's hands;
   (d) a second user-operated control for generating a second control signal for controlling a second aspect of the play of the video game with the other of said user's hands; and
   e) regulating means for:
      1) adjusting the resistance of the exercise bicycle according to said heart rate signal, wherein the resistance of the exercise bicycle is increased in response to said heart rate signal falling below a first threshold level and the resistance of the exercise bicycle is decreased in response to said heart rate signal exceeding a second threshold level, said second threshold level being greater than said first threshold level;
      2) adjusting the level of difficulty of play of the video game according to said heart rate signal, wherein the level of difficulty of play of the video game is increased in response to said heart rate signal falling below said first threshold level and the level of difficulty of play of the video game is decreased in response to said heart rate signal falling below said second threshold level;
      3) adjusting the play of the video game according to said output level signal;
      4) adjusting the play of the video game according to said first and second control signals; and
      5) adjusting the play of the video game and the exercise bicycle according to a specified exercise profile having at least two exercise phases.

14. An apparatus useable with an exercise device and a video game including display means for displaying the video game, comprising:
   a) means for sensing the aerobic activity level of a user, and for outputting an aerobic activity level signal having a characteristic indicative of said aerobic activity level; and
   b) regulating means for:
      1) adjusting the exercise device according to said aerobic activity level signal; and
      2) adjusting the play of the video game according to said aerobic activity level signal, wherein:
   the exercise device comprises a plurality of difficulty levels;
   the video game comprises a plurality of levels of difficulty of play;
   said regulating means increases the level of difficulty of the exercise device in response to said aerobic activity level signal falling below a first threshold level; and
   said regulating means increases the level of difficulty of play of the video game in response to said aerobic activity level signal falling below a second threshold level.

15. The apparatus of claim 14, further comprising means for sensing the output level of the exercise device, and for outputting an output level signal having a characteristic indicative of said output level, wherein said regulating means adjusts the play of the video game according to said output level signal.

16. The apparatus of claim 14, wherein the video game comprises at least one user-operated control for controlling the play of the video game.

17. The apparatus of claim 16, wherein said apparatus includes a first user-operated control for controlling a first aspect of the play of the video game with one of said user's hands and a second user-operated control for controlling a second aspect of the play of the video game with the other of said user's hands.

18. The apparatus of claim 14, wherein said regulating means decreases the level of difficulty of the exercise device in response to said aerobic activity level signal exceeding a third threshold level, said third threshold level being greater than said first threshold level.

* * * * *

UNITED STATES PATENT AND TRADEMARK OFFICE
CERTIFICATE OF CORRECTION

PATENT NO. : 5,362,069

DATED : November 8, 1994

INVENTOR(S) : Justin Hall-Tipping

It is certified that error appears in the above-indentified patent and that said Letters Patent is hereby corrected as shown below:

Title page, [56] U.S. PATENT DOCUMENTS, add:

| | | |
|---|---|---|
| 4,149,716 | 4/1979 | Scudder |
| 4,358,118 | 11/1982 | Plapp |
| 4,408,613 | 10/1983 | Relyea |
| 4,512,566 | 4/1985 | Bicocchi |
| 4,512,567 | 4/1985 | Phillips |
| 4,530,499 | 7/1985 | Breslow et al. |
| 4,630,817 | 12/1986 | Buckley |
| 4,637,605 | 1/1987 | Ritchie |
| 4,643,421 | 2/1987 | Meyer et al. |
| 5,076,584 | 12/1991 | Openiano |
| 5,229,756 | 7/1993 | Kosugi et al. |
| 5,149,084 | 9/1992 | Dalebout et al. |
| 4,512,567 | 4/1985 | Phillips |
| 4,278,095 | 7/1981 | Lapeyre |
| 4,911,427 | 3/1990 | Matsumoto et al. |
| 4,674,741 | 6/1987 | Pasierb, Jr. et al. |
| 5,195,746 | 3/1993 | Boyd et al. |
| 4,630,817 | 12/1986 | Buckley |

Title page, [56] FOREIGN PATENT DOCUMENTS, add:

| | | |
|---|---|---|
| 1183180 | 02/1983 | Canada |
| DE 3428675A1 | 02/1986 | Germany |
| 0235312 | 02/1986 | EPO |
| 0255142 | 07/1987 | EPO |

UNITED STATES PATENT AND TRADEMARK OFFICE
CERTIFICATE OF CORRECTION

PATENT NO. : 5,362,069                       Page 2 of 2
DATED : November 8, 1994
INVENTOR(S) : Justin Hall-Tipping It is certified that error appears in the above-indentified patent and that said Letters Patent is hereby corrected as shown below:

Title page, [56], add:

OTHER DOCUMENTS

CALMPUTE Calmprix Road Racing Game, Thought Technology Ltd., Montreal, Quebec, 1985.

HR/BVP 100T heart rate monitor, Thought Technology, Montreal, Quebec, January 1985 product catalog.

HR 100T heart rate monitor, Thought Technology, Montreal, Quebec, March 1983 product catalog.

Mace, S., "Games Exhibit Innovations," InfoWorld, July 9, 1984, pp. 35 and 37.

Signed and Sealed this

Sixteenth Day of January, 1996

*Attest:*

BRUCE LEHMAN

*Attesting Officer*           Commissioner of Patents and Trademarks